US011415479B2

(12) United States Patent
Abrahamian (10) Patent No.: US 11,415,479 B2
(45) Date of Patent: Aug. 16, 2022

(54) PRODUCT IMBALANCE ANALYSIS METHODS AND RELATED SYSTEMS AND APPARATUSES

(71) Applicant: Shainin II LLC, Northville, MI (US)

(72) Inventor: John Abrahamian, Tolland, CT (US)

(73) Assignee: Shainin II LLC, Northville, MI (US)

(*) Notice: Subject to any disclaimer, the term of this patent is extended or adjusted under 35 U.S.C. 154(b) by 132 days.

(21) Appl. No.: 16/912,477

(22) Filed: Jun. 25, 2020

(65) Prior Publication Data
US 2021/0404902 A1 Dec. 30, 2021

(51) Int. Cl.
*G01M 1/14* (2006.01)
(52) U.S. Cl.
CPC ...................................... *G01M 1/14* (2013.01)
(58) Field of Classification Search
None
See application file for complete search history.

(56) References Cited

U.S. PATENT DOCUMENTS

2017/0145854 A1* 5/2017 Skilton ................ F01D 21/003

* cited by examiner

*Primary Examiner* — Paul M. West
*Assistant Examiner* — Mark A Shabman
(74) *Attorney, Agent, or Firm* — Stoel Rives LLP (57) ABSTRACT

In some embodiments, a system uses a two-dimensional polar plot to analyze imbalance of components. On the two-dimensional polar plot imbalance magnitude and orientation are depicted relative to a reference. Some embodiments use the two-dimensional polar plot to assess measurement error for measurement devices and components. Some embodiments use the two-dimensional polar plot to determine patterns associated with processing operations to identify sources of imbalance from the manufacturing process. Some embodiments use the two-dimensional polar plot to determine correlations between processing operations to identify sources of imbalance.

12 Claims, 9 Drawing Sheets

PRODUCT IMBALANCE ANALYSIS METHODS AND RELATED SYSTEMS AND APPARATUSES

TECHNICAL FIELD

The present application is directed to analyzing a measurement system for imbalance of parts and more particularly identifying sources of imbalance during the manufacturing process.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In manufacturing, standards help organizations develop and manufacture in an efficient and precise way. A system may have a set of requirements or standards it is expected to meet. Further, components of the system may be required to individually meet a certain standard. For example, a first component may be required to meet a certain dimensional requirement (e.g., a length, height, or width standard).

Some standards set a requirement for a single value measurement such as weight, length, height, or width. These single value measurements may be analyzed to determine if a requirement has been reached. Further, the single value measurements facilitate quick and efficient diagnosis of manufacturing problems.

Other standards cover measurements that can be supplemented with additionally measurements. For example, a component may be associated with a balance standard. The balance measurement will consist of a magnitude and an angular direction. Rotating components often have a balance requirement at the component and assembly level. Analyzing and identifying imbalance sources from the manufacturing process can be accomplished by using both components of the balance measurement including magnitude and direction.

Embodiments described herein allow a measurement system to more accurately and efficiently analyze balance measurements throughout a manufacturing process. Specifically, embodiments herein discuss methods, apparatuses, and systems to verify balance measurements, determine patterns within processing operations or manufacturing stages, and determine correlations between processing operations. While the embodiments herein specifically refer to balance measurements or imbalance measurements, the operations may be applied to other measurements.

In some embodiments, a system uses a two-dimensional polar plot to analyze imbalance of components. On the two-dimensional polar plot, imbalance magnitude and orientation are depicted relative to a reference. Some embodiments may use the two-dimensional polar plot to assess measurement error for measurement devices and components. Some embodiments may use the two-dimensional polar plot to determine patterns associated with processing operations to identify sources of imbalance from the manufacturing process. Some embodiments may use the two-dimensional polar plot to determine correlations between processing operations to identify sources of imbalance.

Various operations will be described as multiple discrete operations, in turn, in a manner that is most helpful in understanding the disclosure. The order of the description, however, should not be construed to imply that these operations are necessarily order dependent. In particular, these operations need not be performed in the order of presentation.

Additional details and examples are provided with reference to the figures below. The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

Figure 1:
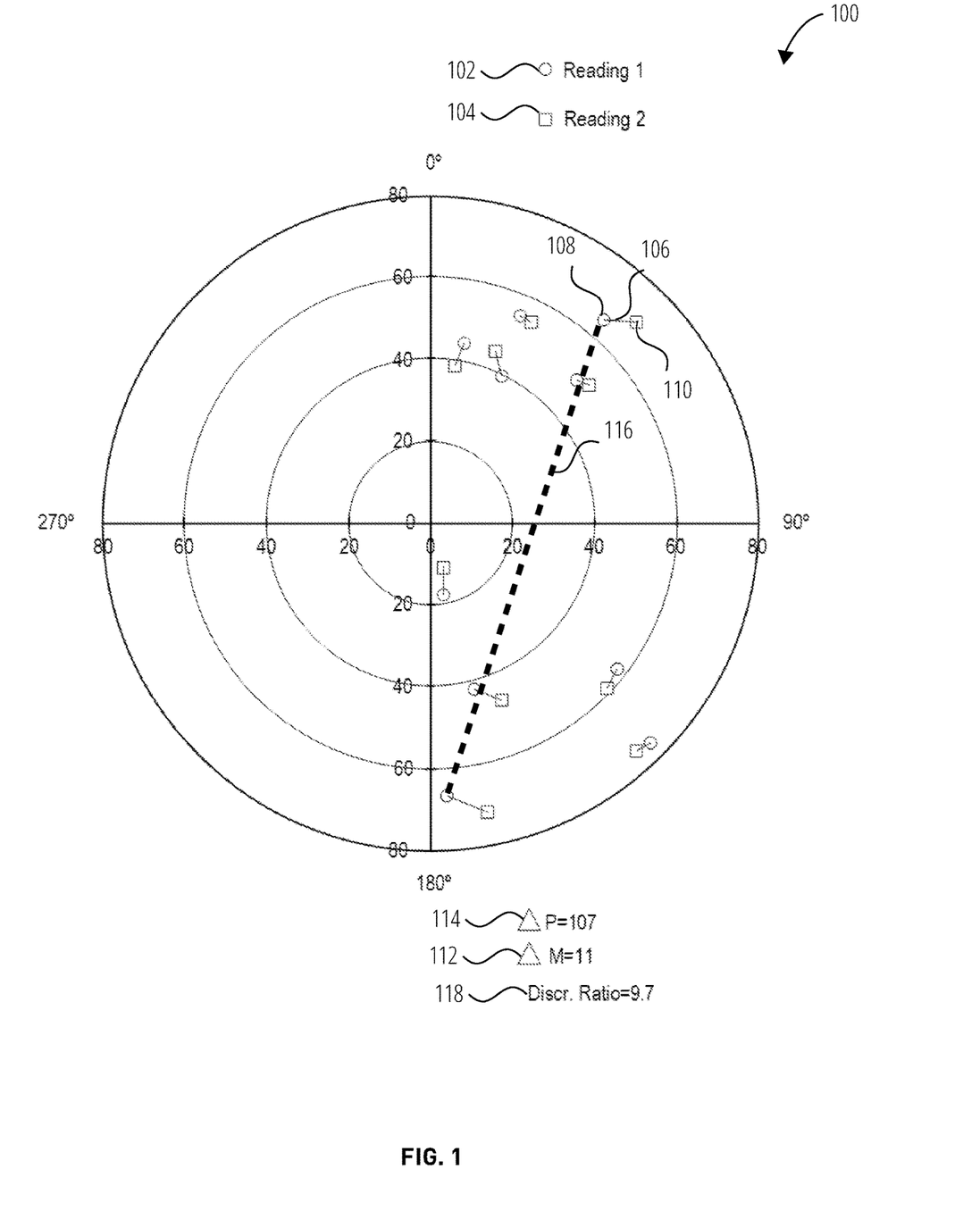
FIG. 1 illustrates a two-dimensional polar plot that a system may use to validate repeatability of measurements from a balance process.

FIG. 1 illustrates a two-dimensional polar plot 100 that a system may use to validate repeatability of measurements from a balance measurement system. The repeatability of the measurements from the balance measurement system may be used to determine capability of the measurement system to identify an unknown cause of imbalance. Rotating components may have a balance requirement at the component and assembly level. A balance measurement system is a device that measures the balance of a component. The balance measurement system provides an imbalance measurement comprising a magnitude and an orientation.

As illustrated, an imbalance value (e.g., each measurement of the first series of measurements 102 and second series of measurements 104) may be displayed on the two-dimensional polar plot 100, where imbalance magnitude and orientation are depicted relative to a reference. A position of a measurement on the two-dimensional polar plot 100 is determined based on the orientation (i.e., angular direction) of the imbalance and magnitude of the imbalance. The angle on the two-dimensional polar plot 100 represents the orientation of the imbalance and a length of the radius between zero and the measurement represents the magnitude of the imbalance.

A system may use the two-dimensional polar plot 100 to determine the reliability or repeatability of the measurements from the balance measurement system. To determine reliability of the measurements, the system determines a measurement error 112 and a product variation 114. The system may assess a measurement error relative to a product variation to determine repeatability of the measurements.

The measurement error and product variation may be determined using a plurality of measurements from the balance measurement system. The plurality of measurements comprise the first series of measurements 102 and the second series of measurements 104. The first series of measurements 102 represents a first imbalance reading for each of a plurality of components. The second series of measurements 104 represents a second imbalance reading for each of the same plurality of components. In other words, the first series of measurements 102 and the second series of measurements 104 each include one point of a pair of points representing two readings for the same part. The system may also determine a vector that joins the two points. The length of the vector represents a measurement difference for that pair.

For example, the system may record a first measurement 108 of a first part and a second measurement 110 of the first part. The system may connect the first measurement 108 and the second measurement 110 with a vector 106. The length of the vector 106 represents the measurement difference between the first measurement 108 and the second measurement 110 for the first part. By creating a workspace to allow for data entry of two imbalance readings of the same parts, a graphical output in the form of a Polar Plot can be created, visually representing the measurement error of the system.

In some embodiments, the system determines the measurement error 112 based on the lengths of the vectors connecting the first series of measurements 102 and the second series of measurements 104 using the two-dimensional polar plot 100. In some embodiments, the system calculates a mean vector length. The mean vector length is the mean of the vectors connecting the first series of measurements 102 and the second series of measurements 104. Additionally, the system may calculate a standard deviation of the vector lengths. The system may use the mean vector length and the standard deviation to calculate the measurement error 112. For example, the system may calculate the measurement error 112 as:

Delta $M$=(mean vector length)+2*(std dev)

In the illustrated embodiment, measurement error 112 is 11.

In some embodiments, the product variation 114 can be based on a distance 116 between the two furthest readings from each of the first series of measurements 102 and second series of measurements 104. In other words, the system estimates product variation using the greatest variation between the furthest points within each group of measurements. For example, in some embodiments, product variation 114 may be calculated by determining a maximum distance between points in the first series of measurements 102 and determining a maximum distance between points in the second series of measurements 104. The product variation 114 may be a minimum of the maximum distance between points in the first series of measurements 102 and the maximum distance between points in the second series of measurements 104. In the illustrated embodiment, the product variation 114 is the maximum distance 116 between points in the second series of measurements 104 which is 107.

Once the measurement error 112 and the product variation 114 are determined, the system may assess the capability of the measurement system to identify an unknown cause of imbalance by comparing the measurement error 112 to the observed product variation 114. For example, the system may determine a discrimination ratio 118 that is calculated by dividing product variation 114 by measurement error 112. The discrimination ratio 118 may be compared to an accuracy threshold. If the discrimination ratio 118 is equal to or above the accuracy threshold, the system may determine that the measurement system is capable of being used to determine an unknown imbalance source. Conversely, if the discrimination ratio 118 is below the accuracy threshold, the system may determine that the measurement system is not capable of being used to determine an unknown imbalance source. In some embodiments, the accuracy threshold may be set to six. In the illustrated embodiment, the discrimination ratio 118 is 9.7 which is greater than six. Therefore, the measurement system is capable of being used to determine an unknown imbalance source.

In some embodiments, the system may generate a report that displays the two-dimensional polar plot 100 along with product variation 114, measurement error 112, and discrimination ratio 118 on a graphical user interface (GUI). The report may also include a recommendation, based on the discrimination ratio 118, of whether to use measurements of the components by the measurement system to identify an unknown imbalance source.

Figure 2:
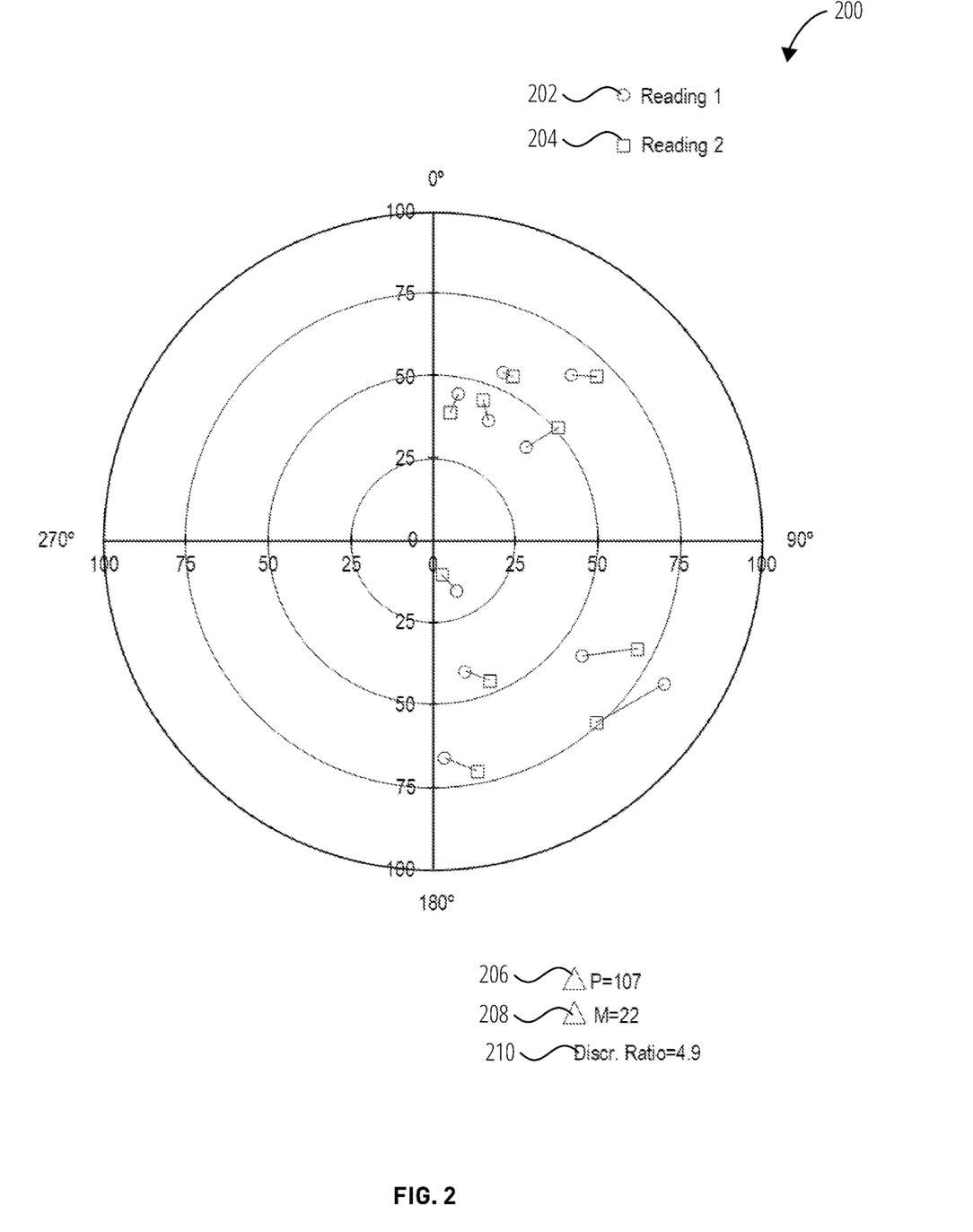
FIG. 2 illustrates a two-dimensional polar plot comprising measurements that are not as repeatable as the measurements in FIG. 1.

FIG. 2 illustrates a two-dimensional polar plot 200 comprising measurements that are not as repeatable as the measurements in FIG. 1. The procedures discussed with reference to FIG. 1 are used to measure the components, determine measurement error 208, determine product variation 206, and determine the discrimination ratio 210.

A plurality of components are measured twice to obtain a first series of measurements 202 and a second series of measurements 204. As illustrated, the calculated measurement error 208 is 22 and the calculated product variation 206 is 107. The resulting discrimination ratio 210 is 4.9 which is less than an accuracy threshold in some embodiments. Therefore, the measurement system is not capable of being used to determine an unknown imbalance source.

A system with these failing results may provide the two-dimensional polar plot 200 and the recommendation to make improvements to the system before using it for general additional balance measurements.

Figure 3:
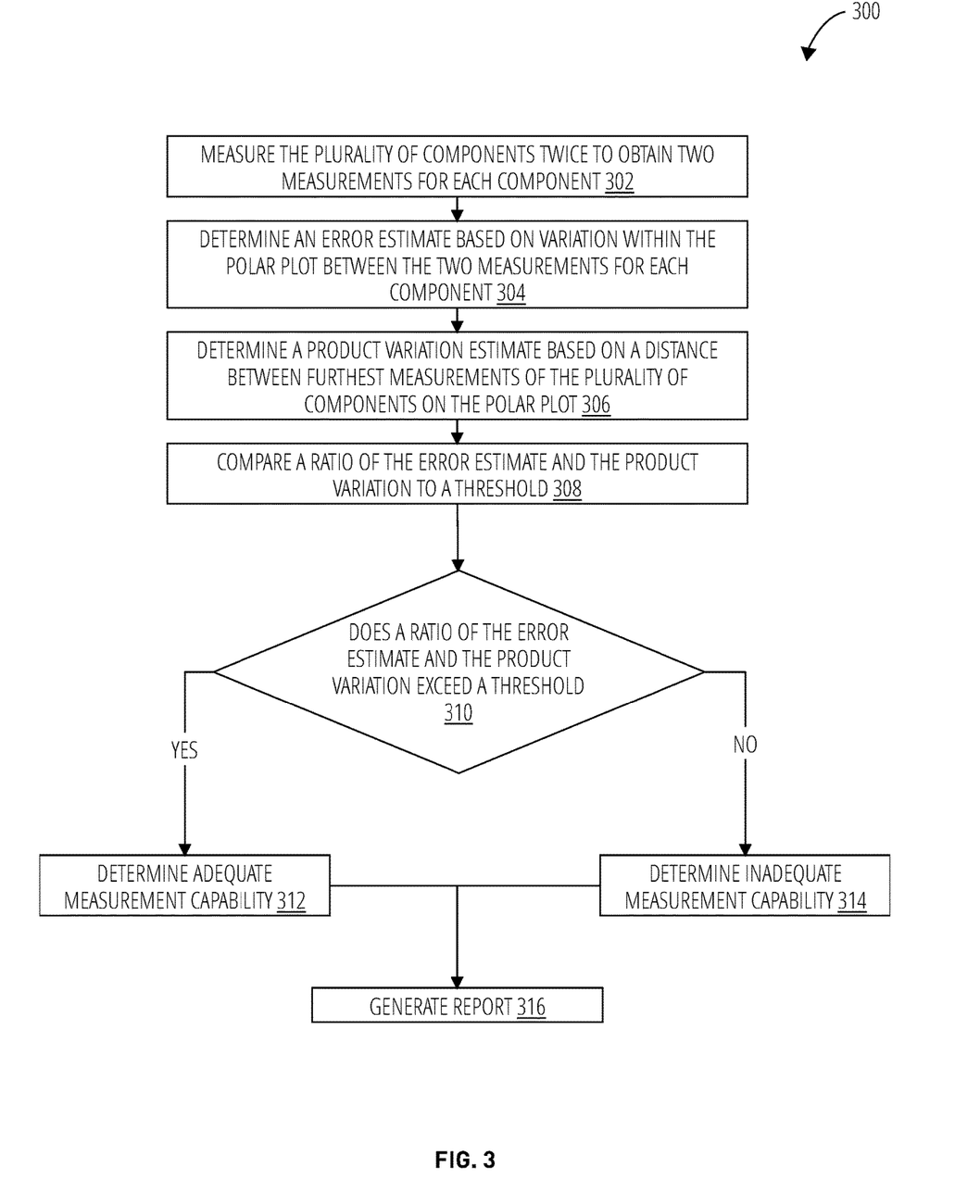
FIG. 3 illustrates a method to assess the capability of the measurement system to identify an unknown cause of imbalance in accordance with one embodiment.

FIG. 3 illustrates a method 300 to assess the capability of the measurement system to identify an unknown cause of imbalance. A system performing the method 300 measures 302 the plurality of components twice to obtain two measurements for each component resulting in a first series of measurements and the second series of measurements. the first series of measurements and the second series of measurements each include one measurement of a pair of measurements representing two readings for the same part. The measurements may be plotted on a two-dimensional polar plot.

In the illustrated embodiment, the method 300 determines 304 a measurement error estimate based on variation within the polar plot between the two measurements for each component. For example, the measurement error may be based on lengths of the vectors connecting the pairs of measurements representing two readings for the same part. In some embodiments, the method 300 calculates a mean vector length. Additionally, the system method 300 may calculate a standard deviation of the vector lengths. The method 300 may use the mean vector length and the standard deviation to calculate the measurement error. For example, the system may calculate the measurement error by multiplying the standard deviation by two (representing 95%) and adding the resulting product to the mean vector length.

In the illustrated embodiment, the method 300 determines 306 a product variation estimate based on a distance between furthest measurements of the plurality of components on the polar plot. For example, in some embodiments, product variation may be calculated by determining a maximum distance between points in the first series of measurements and determining a maximum distance between points in the second series of measurements. The product variation may be a minimum of the maximum distance between points in the first series of measurements and the maximum distance between points in the second series of measurements.

The method 300 may compare 308 a ratio of the error estimate and the product variation to a threshold. If the ratio exceeds the threshold, the method 300 may determine 312 that the measurement system has adequate measurement capability to be used in procedures to determine an unknown imbalance source and/or for purposes of evaluating if the product meets the standards for product quality. If the ratio falls below the threshold, the method 300 may determine 312 that the measurement system does not have adequate measurement capability to be used in procedures to determine an unknown imbalance source and/or for purposes of evaluating if the product meets the standards for product quality.

The method 300 may generate 316 a report with the two-dimensional polar plot, product variation, measurement error, and product variation/measurement error ratio on a graphical user interface (GUI). The report may also include a recommendation, based on the ratio, of whether or not the measurement system has adequate measurement capability to be used in procedures to determine an unknown imbalance source and/or for purposes of evaluating if the product meets the standards for product quality.

Figure 4:
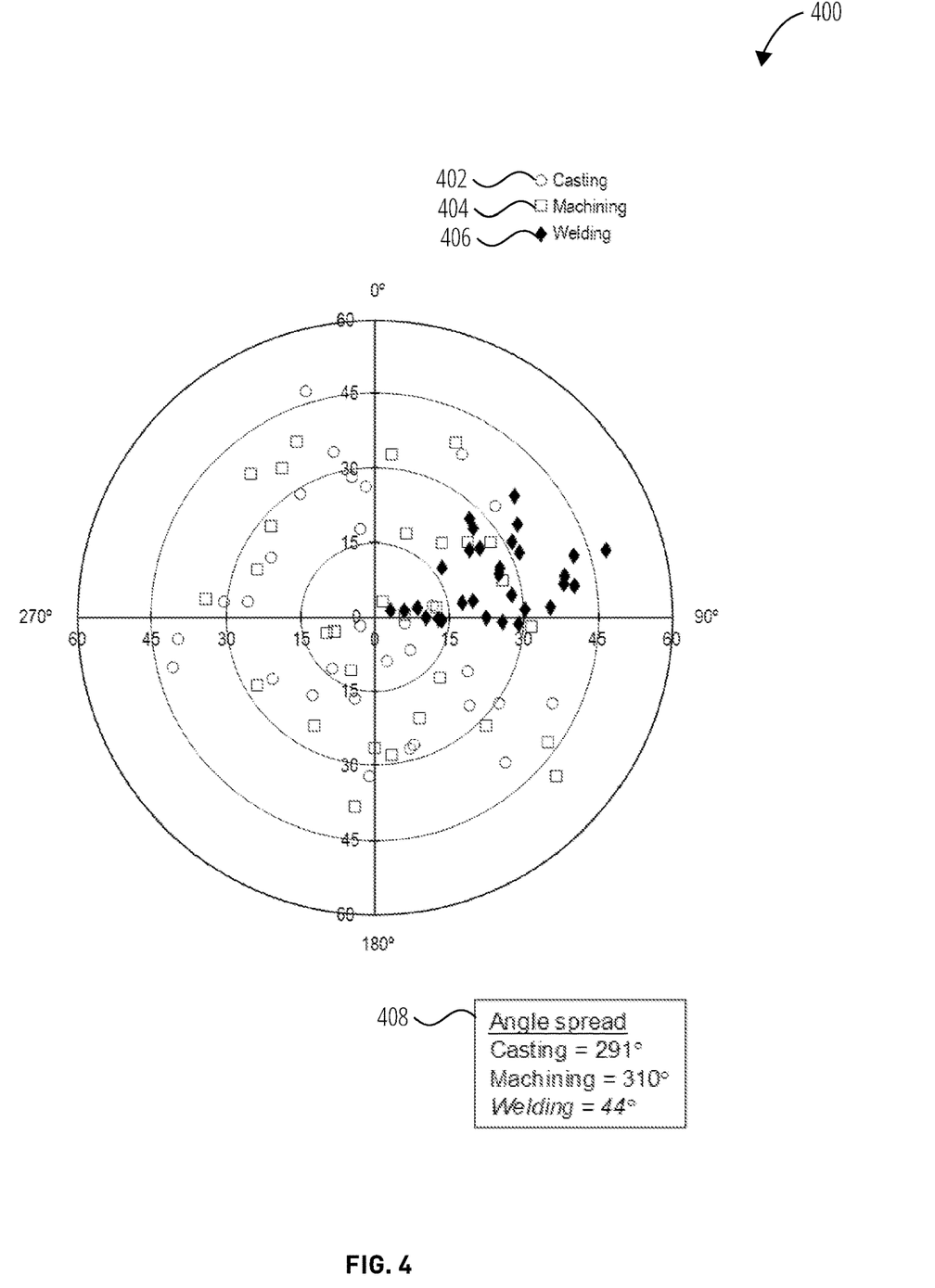
FIG. 4 illustrates a two-dimensional polar plot with imbalance measurements associated with different processing operations in accordance with one embodiment.
Figure 5:
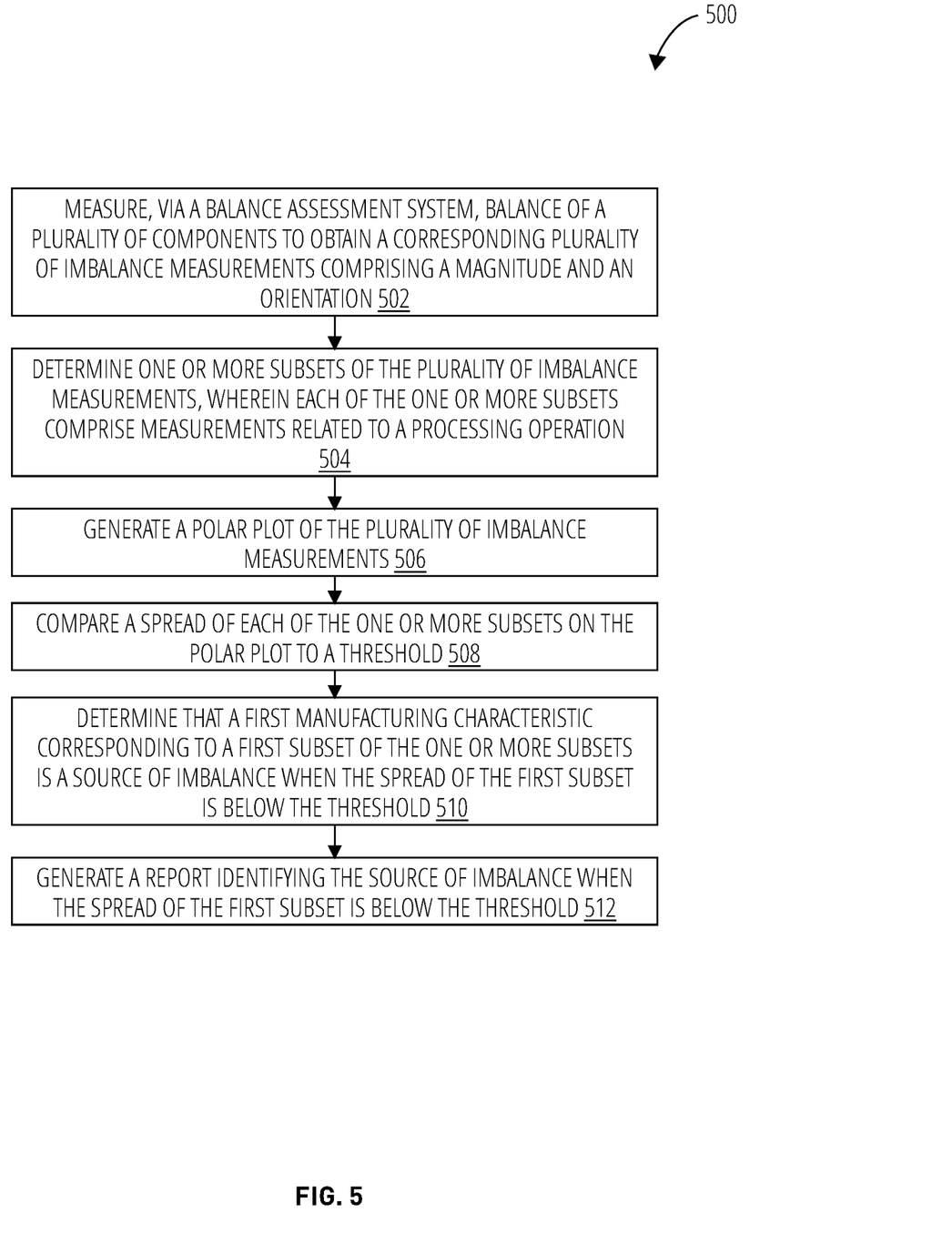
FIG. 5 illustrates a method for assessing balance of components using pattern recognition in accordance with one embodiment.

FIGS. 4-5 illustrate procedures to identify an unknown cause of imbalance using pattern recognition on a plurality of balance measurements correlated with manufacturing characteristics. The manufacturing characteristics are features attributable to fixtures and parameters for processing operations or manufacturing stages such as casting, machining, and welding. In some embodiments, the manufacturing characteristics may be attributable to manufacturing stations such as casting cavities. The measurements may be segregated into subsets, where each subset is associated with a separate feature related to a certain manufacturing stage, fixture, or station. A system may analyze the subsets to determine patterns and interpret the patterns to identify sources of imbalance.

FIG. 4 illustrates a two-dimensional polar plot 400 with balance measurements segregated into three groups or series of measurements associated with different processing operations. After the components are casted, machined, and welded, a balance check may be performed. The balance check may measure the finished component relative to characteristics associated with the different process operations. For example, the measurement groups may be separate balance measurements of a plurality of components taken relative to how they were positioned relative to fixtures associated with casting, machining, welding, and any other process operation. The components may be measured with an orientation relative to a balance zero degree datum positioned relative to a specific process operation. The measurement groups include a casting subset 402, a machining subset 404, and a welding subset 406.

After a component is produced, the component may be placed in a balance measurement system. The balance measurement system may measure the imbalance of the component relative to a casting feature to generate the casting subset 402. The component may be repositioned on the balance measurement system relative to a machining mark indicating how it was positioned relative to the machining fixture to obtain the machining subset 404. Further, the component may be repositioned in the balance measurement system relative to a mark relative to a position indicating how it was positioned relative to the welding fixture to obtain the welding subset 406.

The resulting measurements may be plotted on the two-dimensional polar plot 400 to assess the patterns of the measurements. An imbalance assessment system may receive the measurements and calculate an angle spread 408 for each of the one or more subsets. The angle spread 408 is the smallest angle that captures all of the points of a subset on the two-dimensional polar plot 400. In the illustrated embodiment, the casting subset 402 has an angle spread of 291 degrees, the machining subset 404 has an angle spread of 310 degrees, and the welding subset 406 has an angle spread of 44 degrees.

The imbalance assessment system may use the angle spread 408 to determine imbalance patterns within the measurements. For example, the imbalance assessment system may compare the angle spread 408 for each subset to a threshold. When one of angle spreads is less than the threshold, the imbalance assessment system may determine that the corresponding process operation (e.g., casting, machining, or welding) is a source of imbalance.

For example, in the illustrated embodiment, the welding subset 406 has an angle spread of 44 degrees. If the threshold is set to 75 degrees, the welding subset 406 would be determined to be a source of imbalance. The other subsets have an angle spread that is larger than the threshold so the system would determine that the other subsets are not a source of imbalance. In some embodiments, the imbalance assessment system may generate a report indicating the sources of imbalance.

In some embodiments, a two-dimensional polar plot may include balance measurements segregated into groups or series of measurements associated with different casting cavities. For example, finished parts may be positioned relative to a casting feature, and each series represents a unique casting cavity. An imbalance assessment system may use the measurements on the two-dimensional polar plot to identify a pattern of imbalance with the casting cavities. For example, the imbalance assessment system may compare the spread angles of each of the series to a threshold. Also, the imbalance assessment system may identify groups of casting cavities with similar imbalance measurements.

FIG. 5 illustrates a method 500 to identify an unknown cause of imbalance using pattern recognition on a plurality of balance measurements correlated with manufacturing characteristics. A system performing the method 500 measures 502, via a balance measurement system, balance of a plurality of components to obtain a plurality of imbalance measurements comprising a magnitude and an orientation. For each of the balance measurements, the components (e.g., a finished part) are positioned on the balance measurement system relative to how it was positioned on a fixture for a process operation (e.g., casting, machining, and welding).

The method 500 determines 504 one or more subsets of the plurality of imbalance measurements. Each of the one or more subsets are a grouping of measurements for features of components attributable to a processing operation. The processing operations may include casting, machining, and welding. The method may determine 504 the subsets based on input from the user. For example, the user may indicate what subgroup a measurement belongs to.

The method 500 generates 506 a polar plot of the plurality of imbalance measurements and performs pattern analysis on the polar plot. The pattern analysis may compare 508 a spread of each of the one or more subsets on the polar plot to a threshold. The method 500 determines 510 that a first manufacturing characteristic corresponding to a first subset of the one or more subsets is a source of imbalance when the spread of the first subset is below the threshold. The method 500 may generate 512 a report identifying the source of imbalance when the spread of the first subset is below the threshold. In some embodiments, the method may further includes providing a recommendation for correcting balance of the component.

Figure 6:
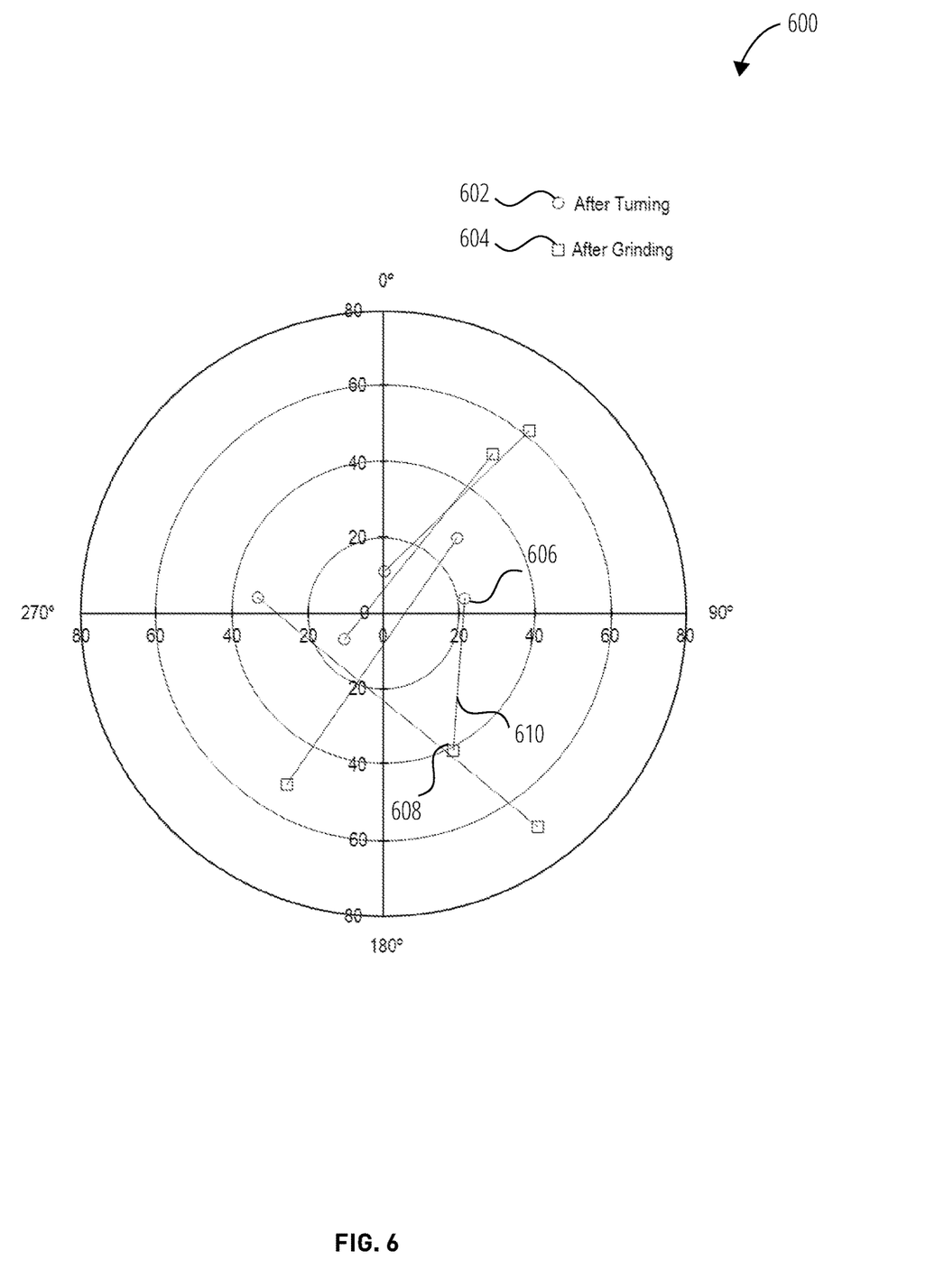
FIG. 6 illustrates a two-dimensional polar plot of measurements taken at different points in a manufacturing process that have a low imbalance correlation.
Figure 7:
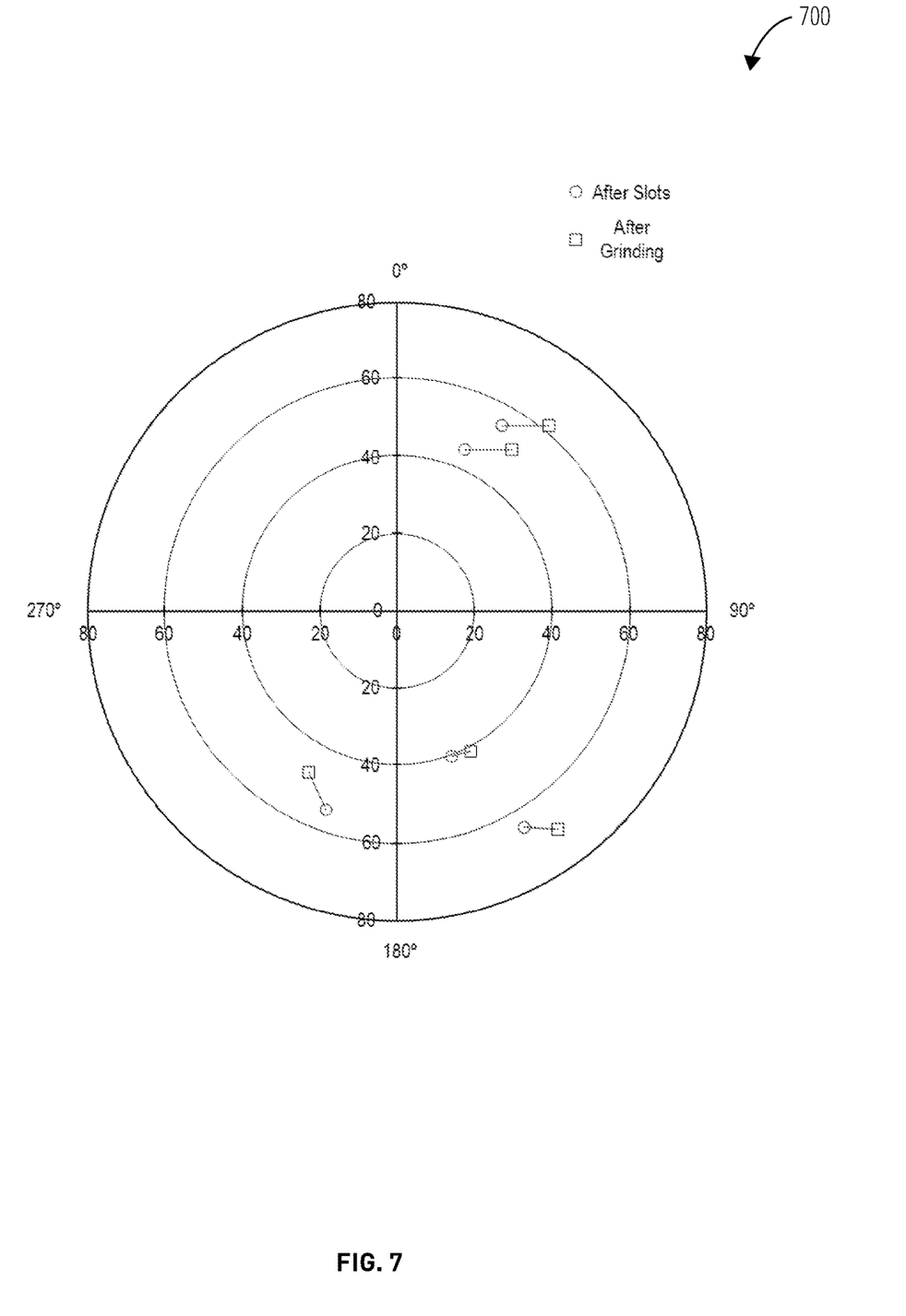
FIG. 7 illustrates a two-dimensional polar plot of measurements taken at different points in a manufacturing process that have a high imbalance correlation.
Figure 8:
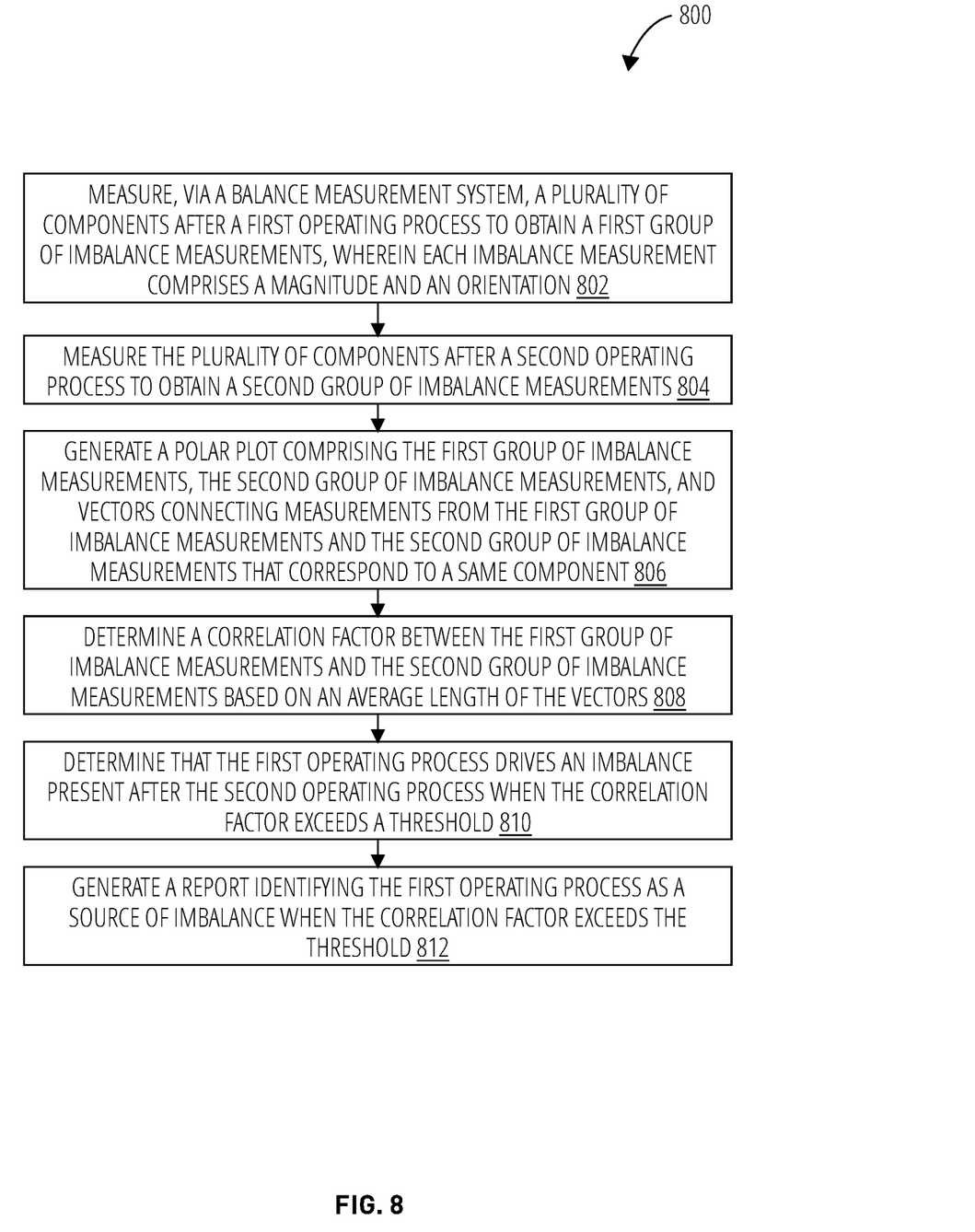
FIG. 8 illustrates a method for assessing balance of components by correlating a plurality of balance measurements across multiple processing operations in accordance with one embodiment.

FIGS. 6-8 illustrate procedures to identify an unknown cause of imbalance by correlating a plurality of balance measurements across multiple processing operations. A correlation analysis between two factors is useful when searching for a cause-effect relationship.

A correlation analysis can be displayed with the points plotted on an X-Y scatter plot. for example, a best fit regression line is projected through the points and various analytical approaches can be applied to estimate how well the x factor correlates to the y using an R-squared value. R-squared is a statistical measure that can be used to determine how close the data set is fitted to the regression line. R-squared is the percentage of the response variable variation that is explained by the linear model. The higher the R-squared, the better the model fits the data.

While the best fit regression line works for an X-Y scatter plot, it is not suitable for polar plots. The embodiments discussed in relation to FIGS. 6-8 provide a statistical measure of the correlation between two data sets for a 2D polar plot. The embodiments use two imbalance measurements for the same part where each imbalance measurement is taken after separate processing operations and produce a correlation value between the separate processing operations.

FIG. 6 illustrates a two-dimensional polar plot 600 with two groups of measurements taken at different points in a manufacturing process that have low imbalance correlation. A first group comprises measurements after turning 602 and a second group comprises measurements after grinding 604. The measurements are imbalance readings of the same parts. An imbalance assessment system may provide a workspace for data entry of the two imbalance readings of the same parts.

From the imbalance readings, the imbalance assessment system may create a graphical output in the form of the two-dimensional polar plot 600. The two-dimensional polar plot 600 visually represents the change in part unbalance at different points in a manufacturing process. The measurements after turning 602 and the measurements after grinding 604 each include one point of a pair of points representing two readings for the same part. The system may also determine a vector that joins the two points. The length of the vector represents a change in balance that pair.

For example, a first measurement 606 is an imbalance reading of a part after turning. A second measurement 608 is an imbalance reading of the part after grinding. A vector 610 is generated that connects the first measurement 606 and the second measurement 608. The vector 610 represents the change in balance of the part that occurred between the turning operation and the grinding operation.

With the two points representing the two readings for the same part at different points in the manufacturing process, and joining those points with a vector line, the length of the line can indicate good or poor correlation. A good correlation would result in the the length of the vector being smaller, and a poor correlation would result in the length of the vector being larger. A good correlation indicates that the imbalance in the later process operation is driven by the earlier process operation. Whereas, a bad correlation indicates that the imbalance in the later process operation is not driven by the earlier process operation Using the same data set and the same two-dimensional polar plot 600, product variation can be estimated by using the greatest variation between the furthest points within each group. The product variation may be a minimum of the maximum distance between points in the measurements after turning 602 and the maximum distance between points in the measurements after grinding 604. For example, the system may determine the maximum distance between points in the measurements after turning 602 and determine the maximum distance between point in the measurements after grinding 604. Whichever of these two maximums may be used as the product variation.

The imbalance assessment system may compare the average vector line length and the product variation estimate to determine a correlation factor. For example, the imbalance assessment system may calculate the correlation factor as:

correlation factor=1−(average vector length/product variation)

A good correlation would have a high correlation factor and a poor correlation would have a low correlation factor.

In the illustrated embodiment, the correlation factor is correlation factor=1−109/113=3%

The imbalance assessment system may compare the correlation factor to a threshold to determine whether the correlation is good or poor. In some embodiments, the threshold may be a value between 70-80%. For example, the threshold may be 75%. Here the imbalance assessment system detects that the imbalance readings have a poor correlation. Thus, the system determines that the imbalance after grinding is not driven by the turning operation. The imbalance assessment system may generate a report indicating this determination.

FIG. 7 illustrates a two-dimensional polar plot 700 with two groups of measurements taken at different points in a manufacturing process that have a high imbalance correlation. In the illustrated embodiment, the imbalance was measured after a grinding operation and after the machining of the slots.

As discussed in relation to FIG. 6, a correlation factor may be determined using an average vector length and a product variation value. In the illustrated embodiment, the correlation factor is 1−16/104 which equals 84.6%. In this embodiment, the imbalance assessment system would detect that the imbalance readings have a good correlation as the correlation factor is greater than a threshold (e.g., 75%). Thus, the system determines that the imbalance after grinding is driven by the slot machining operation. In some embodiments, the system may also use this determination to rule the other operations (and incoming casting) as the cause of the part imbalance after the grinding operation.

FIG. 8 illustrates a method 800 to identify an unknown cause of imbalance by correlating a plurality of balance measurements across multiple processing operations. The method 800 measures 802, via a balance measurement system, a plurality of components after a first operating process to obtain a first group of imbalance measurements. Additionally, the method 800 measures 804 the plurality of components after a second operating process to obtain a second group of imbalance measurements.

The method 800 generates 806 a polar plot comprising the first group of imbalance measurements, the second group of imbalance measurements, and vectors connecting measurements from the first group of imbalance measurements and the second group of imbalance measurements that correspond to a same component. The method 800 determines 808 a correlation factor between the first group of imbalance measurements and the second group of imbalance measurements based on an average length of the vectors. The method 800 determines 810 that the first operating process drives an imbalance present after the second operating process when the correlation factor exceeds a threshold. The method 800 generates 812 a report identifying the first operating process as a source of imbalance when the correlation factor exceeds the threshold.

Figure 9:
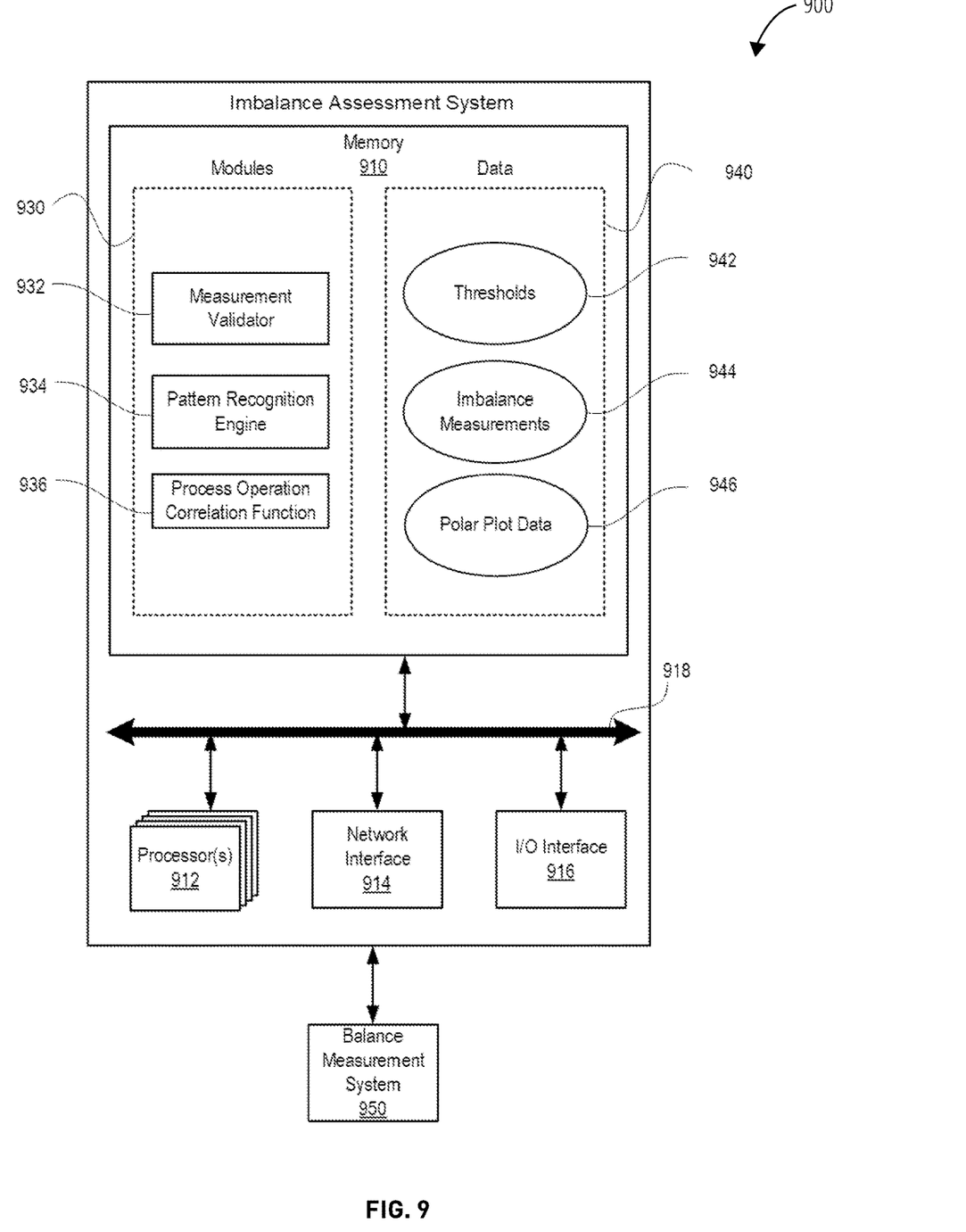
FIG. 9 is a block diagram illustrating an imbalance assessment system for redundancy and conflict detection in a design of a system, device, or process, according to one embodiment.

FIG. 9 is a block diagram illustrating an imbalance assessment system 900 for redundancy and conflict detection in a design of a system, device, or process, according to one embodiment. The imbalance assessment system 900 includes a memory 910, one or more processors 912, a network interface 914, and an input/output (I/O) interface 916.

The processor 912 may be used to process executable code and data stored in the memory 910. The memory 910 may include static RAM, dynamic RAM, flash memory, one or more flip-flops, or other electronic storage medium. The electronic memory 910 may include a plurality of modules 930 and data 940. The modules 930 may run multiple operations serially, concurrently or in parallel on the one or more processors 912.

In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. A software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implement particular abstract data types. A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media.

In one embodiment, the modules 930 include a measurement validator 932. The measurement validator 932 may include executable code and/or other data that can be processed by the processor 912. The measurement validator 932 may be used to assess the capability of the measurement system to identify an unknown cause of imbalance. The measurement validator 932 may implement the procedures described with reference to FIGS. 1-3 using an accuracy threshold of the thresholds 942, the imbalance measurements 944, and the polar plot data 946.

A pattern recognition engine 934 may include executable code and/or other data that can be processed by the processor 912. The pattern recognition engine 934 may be used to identify an unknown cause of imbalance using pattern recognition on a plurality of balance measurements associated with various processing operations. The pattern recognition engine 934 may implement the procedures described with reference to FIGS. 4-6 using an angle spread threshold of the thresholds 942, the imbalance measurements 944, and the polar plot data 946.

The process operation correlation function 936 may include executable code and/or other data that can be processed by the processor 912. The process operation correlation function 936 may be used identify an unknown cause of imbalance by correlating a plurality of balance measurements across multiple processing operations. The pattern recognition engine 934 may implement the procedures described with reference to FIGS. 7-9 using a correlation threshold of the thresholds 942, the imbalance measurements 944, and the polar plot data 946.

The data 940 stored on the memory 910 may include the data 940 generated by the imbalance assessment system 900, such as by the modules 930 or other modules. The data 940 stored may be organized as one or more memory registers/addresses, files, and/or databases. The data 940 may include thresholds 942, a imbalance measurements 944, and a polar plot data 946. The thresholds 942 may include a set of thresholds such as an accuracy threshold, a spread angle threshold, and a correlation threshold. The thresholds 942 may be pre-configured or may be input by a user. The imbalance measurements 944 may be readings received from the imbalance measurement system 950 and may include an angle and magnitude of imbalance. The polar plot data 946 may include polar plot information, such as coordinates of the imbalance measurements 944 on a polar plot, spread angle of subsets of measurements, vector lengths between measurements, an average vector length, and product variation.

The network interface 914 may facilitate communication with other computing devices and/or networks, such as the Internet and/or other computing and/or communications networks. The network interface 914 may be equipped with conventional network connectivity. The network interface 914 may be a wireless network interface, equipped with conventional wireless network connectivity technologies.

The I/O interface 916 may facilitate interfacing with the imbalance assessment system 900. For example, the I/O interface 916 may provide a report indicating sources of imbalance, accuracy of measurements, and a polar plot.

A system bus 918 may facilitate communication and/or interaction between the other components of the imbalance assessment system 900, including the memory 910, the one or more processors 912, the network interface 914, and the I/O interface 916.

As can be appreciated, in other embodiments, the imbalance assessment system 900 may be simpler than shown or described. For example, certain designs may forgo one or more components, such as memory, multiple processors, multiple interfaces, and the like, and instead execute instructions closer to or on bare metal (e.g., without intervening operating system or other software layer, executing instructions directly on logic hardware).

EXAMPLE SECTION

The following examples pertain to further embodiments.

Example 1 may include an apparatus comprising means to perform one or more elements of a method described in or related to any of the methods or processes described herein.

Example 2 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3 may include an apparatus comprising logic, modules, or circuitry to perform one or more elements of a method described in or related to any of the above Examples, or any other method or process described herein.

Example 4 may include a method, technique, or process as described in or related to any of the above Examples, or portions or parts thereof.

Example 5 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 7 may include a computer program comprising instructions, wherein execution of the program by a processing element is to cause the processing element to carry out the method, techniques, or process as described in or related to any of the above Examples, or portions thereof.

Example 8 may include a system to perform one or more elements of a method described in or related to any of the methods or processes described herein.

Example 9 may include a device for performing one or more elements of a method described in or related to any of the methods or processes described herein.

Embodiments and implementations of systems and methods described herein may include various steps, which may be embodied in machine-executable instructions to be executed by a computer system. A computer system may include one or more general-purpose or special-purpose computers (or other electronic devices). The computer system may include hardware components that include specific logic for performing the steps or may include a combination of hardware, software, and/or firmware.

Aspects of certain embodiments may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implement particular abstract data types. A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media.

Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network. According to one embodiment, a database management system (DBMS) allows users to interact with one or more databases and provides access to the data contained in the databases.

Embodiments may be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Although the foregoing has been described in some detail for purposes of clarity, it will be apparent that certain changes and modifications may be made without departing from the principles thereof. It should be noted that there are many alternative ways of implementing the processes, apparatuses, and system described herein. Accordingly, the present embodiments are to be considered illustrative and not restrictive, and the invention is not to be limited to the details given herein, but may be modified within the scope and equivalents of the appended claims.

As used herein, the terms "comprises," "comprising," and any other variation thereof are intended to cover a non-exclusive inclusion, such that a process, a method, an article, or an apparatus that comprises a list of elements does not include only those elements but may include other elements not expressly listed or inherent to such process, method, system, article, or apparatus.

It will be apparent to those having skill in the art that many changes may be made to the details of the above-described embodiments without departing from the underlying principles of the invention. The scope of the present invention should, therefore, be determined only by the following claims.

What is claimed is:

1. A balance assessment system comprising:
   a balance measurement system;
   a processor in communication with the balance measurement system; and a memory storing instructions that, when executed by the processor, configure the balance assessment system to:
measure, via the balance measurement system, balance of a plurality of components to obtain a corresponding plurality of imbalance measurements comprising a magnitude and an orientation;
determine one or more subsets of the plurality of imbalance measurements, wherein each of the one or more subsets comprise measurements of components that are related to a manufacturing characteristic;
generate a polar plot of the plurality of imbalance measurements;
compare a spread of each of the one or more subsets on the polar plot to a threshold;
determine that a first manufacturing characteristic corresponding to a first subset of the one or more subsets is a source of imbalance when the spread of the first subset is less than the threshold;
generate a report identifying the source of imbalance when the spread of the first subset is less than the threshold; and
validate repeatability of measurements from the balance measurement system by further configuring the balance assessment system to:
measure the plurality of components twice to obtain two measurements for each component;
determine an error estimate based on variation within the polar plot between the two measurements for each component;
determine a product variation estimate based on a distance between furthest measurements of the plurality of components on the polar plot; and
compare a ratio of the error estimate and the product variation to an accuracy threshold.

2. The balance assessment system of claim 1, the instructions further to configure the balance assessment system to determine an angle spread for each of the one or more subsets representing an angle on the polar plot that includes each measurement of a particular subset, wherein the spread of each of the one or more subsets is the angle spread on the polar plot.

3. The balance assessment system of claim 2, wherein the threshold is a spread angle of 75 degrees.

4. The balance assessment system of claim 1, wherein the manufacturing characteristics comprise features attributable to a set of operating process.

5. The balance assessment system of claim 4, wherein the set of manufacturing operating process comprises one or more of casting, machining, and welding.

6. The balance assessment system of claim 1, wherein the manufacture characteristics comprise manufacturing stations.

7. A method for assessing balance of components, the method comprising:
measuring, via a balance measurement system, balance of a plurality of components to obtain a corresponding plurality of imbalance measurements comprising a magnitude and an orientation;
determining one or more subsets of the plurality of imbalance measurements, wherein each of the one or more subsets comprise measurements of components that are related to a manufacturing characteristic;
generating a polar plot of the plurality of imbalance measurements;
comparing a spread of each of the one or more subsets on the polar plot to a threshold;
determining that a first manufacturing characteristic corresponding to a first subset of the one or more subsets is a source of imbalance when the spread of the first subset is less than the threshold;
generating a report identifying the source of imbalance when the spread of the first subset is less than the threshold; and
validating repeatability of measurements from the balance measurement system by:
measuring the plurality of components twice to obtain two measurements for each component;
determining an error estimate based on variation within the polar plot between the two measurements for each component;
determining a product variation estimate based on a distance between furthest measurements of the plurality of components on the polar plot; and
comparing a ratio of the error estimate and the product variation to an accuracy threshold.

8. The method of claim 7, further comprising determining an angle spread for each of the one or more subsets representing an angle on the polar plot that includes each measurement of a particular subset, wherein the spread of each of the one or more subsets is the angle spread on the polar plot.

9. The method of claim 8, wherein the threshold is a spread angle of 75 degrees.

10. The method of claim 7, wherein the manufacturing characteristics comprise features attributable to a set of manufacturing stages.

11. The method of claim 10, wherein the set of manufacturing stages comprises one or more of casting, machining, and welding.

12. The method of claim 7, wherein the manufacturing characteristics comprise manufacturing stations.

* * * * *